United States Patent [19]

Lisch

[11] Patent Number: 5,671,856
[45] Date of Patent: Sep. 30, 1997

[54] UNIVERSAL STACKABLE LOCKING CONTAINER

[76] Inventor: Scott Lisch, 89A Asbury Rd., Hackettstown, N.J. 07840

[21] Appl. No.: 654,108

[22] Filed: May 28, 1996

[51] Int. Cl.⁶ .................................................. B65D 21/032
[52] U.S. Cl. ........................... 220/4.27; 220/302; 206/519
[58] Field of Search .............................. 220/4.27, 300, 220/301, 302, 326; 206/519

[56] References Cited

U.S. PATENT DOCUMENTS

| | | | |
|---|---|---|---|
| 491,865 | 2/1893 | Wynn | 220/4.27 |
| 3,039,226 | 6/1962 | Bagdonas . | |
| 3,281,006 | 10/1966 | Wei | 220/4.27 |
| 3,509,813 | 5/1970 | Appelt | 220/4.27 |
| 5,386,922 | 2/1995 | Jordan . | |
| 5,542,206 | 8/1996 | Lisch | 220/4.27 |

*Primary Examiner*—Stephen J. Castellano
*Attorney, Agent, or Firm*—Michael I. Kroll

[57] ABSTRACT

A universal stackable locking container (10) comprising a plurality of independent trays (12), in which each tray (12) can store small articles therein. Each tray (12) includes a cylindrical side wall (14) having an open top (16) with an annular rim (18) thereabout, a disc-shaped bottom wall (20) and an upstanding central barrel (22) formed on the bottom wall (20). The barrel (22) has a finger hole (24) therethrough, so that a person can insert a finger into the finger hole (24) and grip the barrel (22) to lift and carry the tray (12). A structure (26) is in each tray (12), for stacking the trays (12) one upon the other. An assembly (28) is in each tray (12) for interlocking and unlocking the trays (12) when the trays (12) are stacked one upon the other. A cover (30) fits upon the uppermost tray (12). A facility (32) is in the cover (30), for interlocking and unlocking the cover (30) to the upper most tray (12).

11 Claims, 3 Drawing Sheets

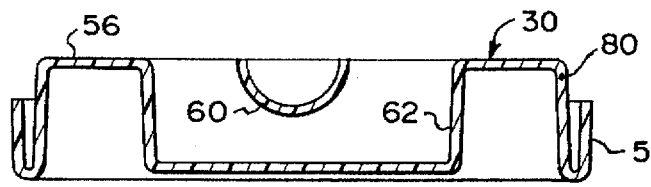
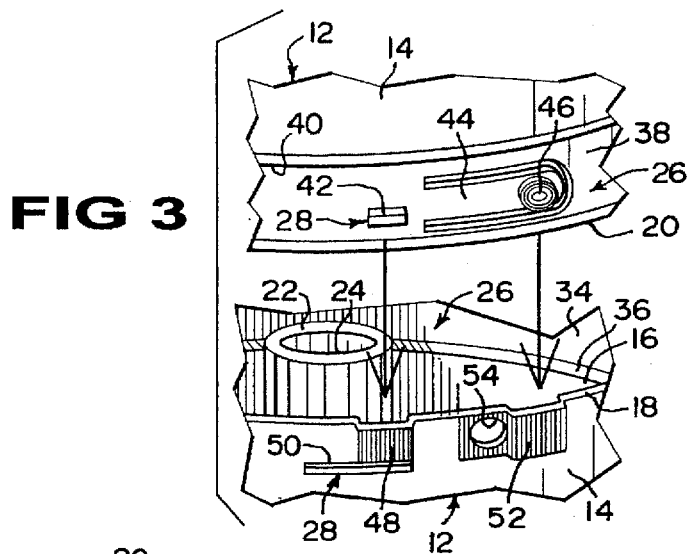
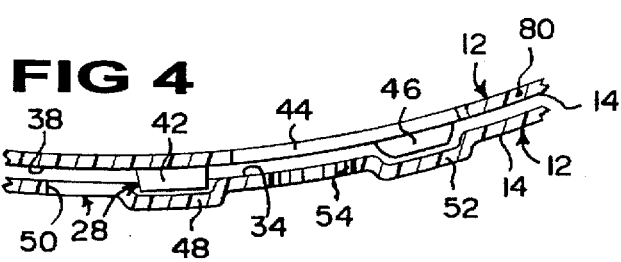
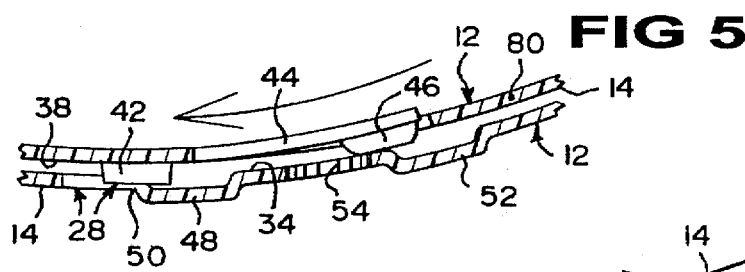
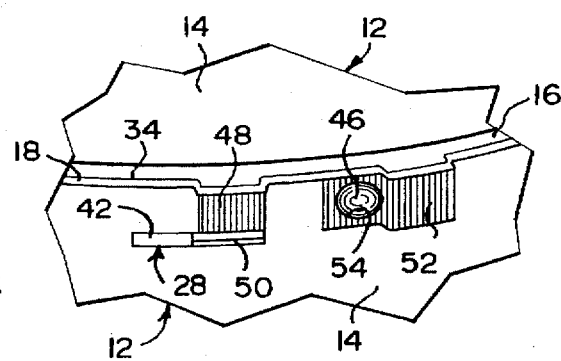

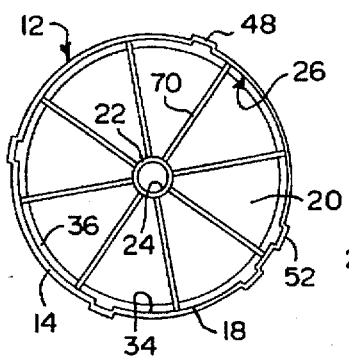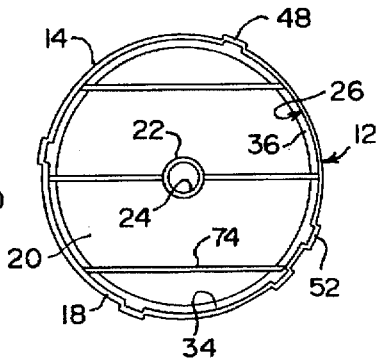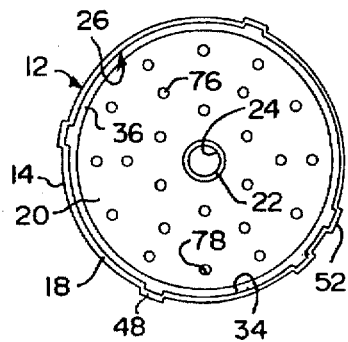
FIG 7A   FIG 7B   FIG 7C
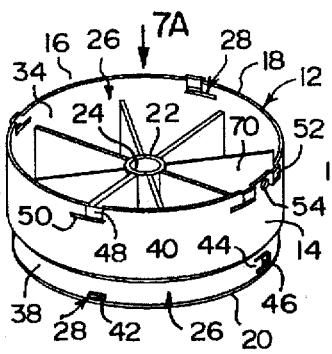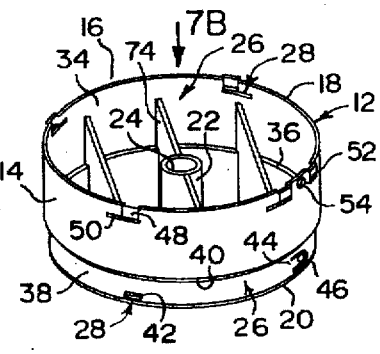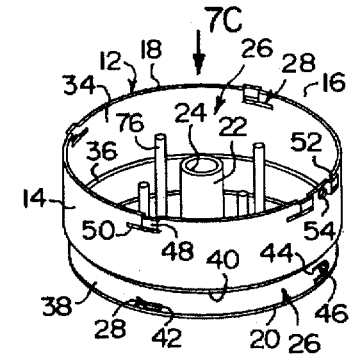
FIG 7A-1   FIG 7B-1   FIG 7C-1
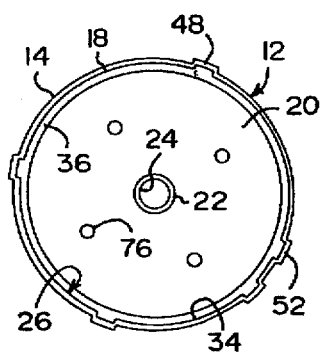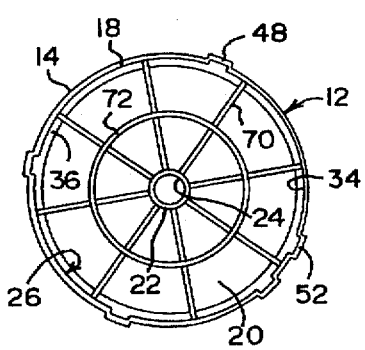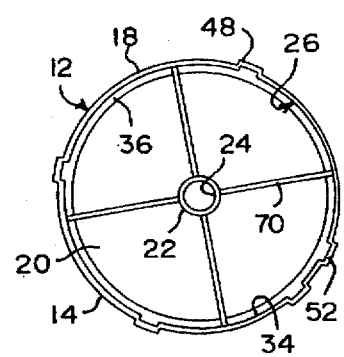
FIG 7D   FIG 7E   FIG 7F
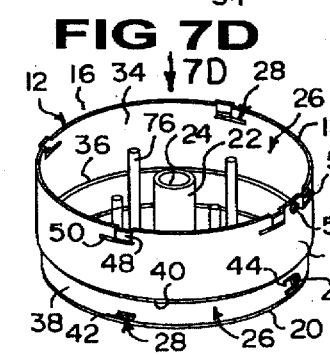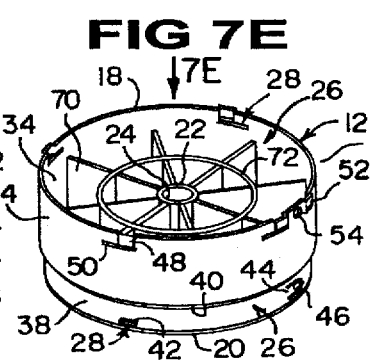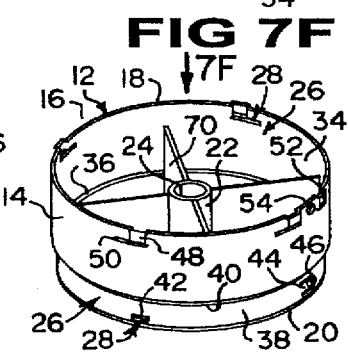
FIG 7D-1   FIG 7E-1   FIG 7F-1

UNIVERSAL STACKABLE LOCKING CONTAINER

BACKGROUND OF THE INVENTION

1. Field of the Invention

The instant invention relates generally to storage devices and more specifically it relates to a universal stackable locking container.

2. Description of the Prior Art

Numerous storage devices have been provided in prior art. For example, U.S. Pat. Nos. numbered 908,338 to Sheble et al.; 3,039,226 to Bagdonas; 3,369,691 to Wei; 4,067,607 to Battles; 4,200,249 to Synstelien et al.; 4,474,291 to Fortson; 4,700,502 to McFarland et al.; 4,782,619 to Richards; 4,827,658 to Wolniak and 5,386,922 to Jordan all are illustrative of such prior art. While these units may be suitable for the particular purpose to which they address, they would not be as suitable for the purposes of the present invention as heretofore described.

SHEBLE, HORACE
HAWTHORNE, ELLSWORTH A.
BOX OR CASE FOR TALKING MACHINE NEEDLES
U.S. Pat. No. 908,338

A box or case for talking machine needles. The box or case has a plurality of compartments, each adapted for receiving and retaining needles. A lid or cover has needle-receiving chambers or pockets in the top of the same, and has in it a single opening communicating with but one of the compartments of the box.

BAGDONAS, ANTHONY J.
FISHING TACKLE CONTAINER
U.S. Pat. No. 3,039,226

In a fishing tackle container, an open top one-piece shallow receptacle unit of plastic material has a bottom wall, a peripheral wall and a plurality of projections on the inner side of the bottom wall for engagement with portions of fishing tackle. The peripheral wall is formed with a pair of spaced peripheral flanges. The peripheral wall and the two flanges form a spool to be wound by fishing tackle leaders. There is at least one slot in the peripheral wall and one of the flanges thereof to permit fishing tackle to extend therethrough. The projections form spaced channels to receive portions of fishing tackle. The receptacle unit is made of resilient material for the walls of the channels to yieldingly grip portions of fishing tackle. The receptacle unit is formed with a socket for frictional engagement with an adjoining receptacle unit. A plurality of the receptacle units may be stacked in releasable engagement with each other to form a composite receptacle with the bottom wall of one receptacle unit closing the open top of an adjacent receptacle unit.

WEI, TOHCHUNG
STACKED FOOD CONTAINERS
U.S. Pat. No. 3,369,691

This disclosure describes an assembly of stacked cylindrical containers, with a flat insulated cover or stopper for each container. The stoppers of the containers serve to hold the containers together and also are used to carry the containers.

BATTLES, LEE J.
COMBINATION STOOL AND FISHING TACKLE BOX
U.S. Pat. No. 4,067,607

An upright cylindrical housing having closed ends is provided with a wall diametrically and longitudinally divided intermediate its ends to define a stationary wall portion and a movable wall portion. The movable wall portion forms a door slideably disposed in circular tracks formed by the respective end of the housing to cover and uncover an access opening formed by the divided wall. The housing is transversely divided by a plurality of partitions arranged in vertically spaced relation to form a plurality of compartments. Each of the partitions rotatably support a circular upwardly open fishing tackle receiving tray with each of the trays being movable outwardly through the access opening with respect to its supporting partition by a radial slot formed in the respective partition.

SYNSTELIEN, FLOYD L.
YSTEBOE, HOWARD T.
STORAGE DEVICE
U.S. Pat. No. 4,200,249

A two part storage device for strands includes a case, bobbin and bobbin brake. Storage compartments are provided inside the winding surface of the bobbin and are accessible through an integral door in the case. An H-section hook secures the device to a belt or strap.

FORTSON, WARREN D.
TACKLE BOX WITH PIVOTAL TRAYS
U.S. Pat. No. 4,474,291

A tackle box with a plurality of independently pivotal trays oriented in a tiered arrangement and provided with a side closure for each side of the box. In one embodiment, the tackle box housing includes a bottom member, a pair of end members upstanding from the bottom member connected by connecting walls to form a U-shaped structure, a generally U-shaped flanged end receiver coupling pairs of the end members, a top support channel bridging the tackle box housing and supported at its ends by a top support adaptor connected to the U-shaped end receiver, a carrying handle on the top support channel, a central divider secured to the bottom member and fastened to the top support channel and handle, a series of bait trays having opposite ends pivoted to the end member and a side cover assembly including a guide bar and an interlocking lip disposed to be received within an adjacent space. When in its extended position, the side cover assembly extends as a cover peripherally of the tackle box housing and has a series of snap buttons at the lower edge thereof for engaging a snap button arrangement on a hingedly provided side door thereby completing respective closure coverings for the tackle box. In another embodiment, an articulated hinged side cover is provided to fold back and allow access to the trays in the tackle box, thereby greatly simplifying the structure.

McFARLAND, RONALD F.
APPARCEL, RICHARD A.
SEGMENTED TUBULAR FISHING GEAR CONTAINER
U.S. Pat. No. 4,700,502

A container carried on the person and comprising tubular segments joined in end-to-end fashion by fittings on each segment. End walls serve to close one end of each segment. A pole holder is mounted on a tubular segment and may be detached from the container and thence coupled with a stake assembly for ground insertion. Stacked cylindrical receptacles may be stowed in the tubular segments as may spools of leader with the leaders being threaded through openings in a tubular segment sidewall. A sling permits carrying of the container on the user's shoulder.

RICHARDS, MARK S.

MODULAR FISHING TACKLE BOX

U.S. Pat. No. 4,782,619

A modular fishing tackle box includes a box portion, a lid, and a plurality of modular members detachably securable beneath the box portion and to each other. The modular members can each include one or more transversely slideable drawers for containing fishing tackle or the like, accessible without detachment of the modular members from the box portion. Alternatively, the modular members can themselves be dimensioned to receive tackle therein, and moved with respect to the box portion or associated members, so as to expose the fishing tackle for use. The modular members are connected to the box portion or each other by a pair of spaced slideable tongue and groove joints on the top and bottom of each member, and the bottom of the box portion. The joints are each formed as a pair of L-shaped flanges. The fishing tackle box is constructed throughout from an inert, molded plastic material, resistant to rusting and corrosion, especially from salt water.

WOLNIAK, ROBERT T.

FISHING TACKLE BOX WITH VERTICAL STORAGE COMPARTMENTS

U.S. Pat. No. 4,827,658

A fishing tackle box having a plurality of vertically disposed storage compartments or tubes for containing various size fishing lures. The vertically disposed tubes are formed from transparent plastic and positioned in the tackle box with a portion thereof extending upwardly from the base portion of the tackle box to permit the lures carried within the vertically disposed storage compartments or tubes to be readily seen for facilitating lure selection.

JORDAN, RAYMOND L.

CONTAINER WITH STACKABLE TRAYS

U.S. Pat. No. 5,386,922

A system of trays and inserts placed in each tray, for converting a bucket to an organized receptacle for storing and dispensing small parts or objects. Trays are circular, and are stacked within the bucket. Each tray has low partitions, dividing the tray into pie slice segments. An insert is placed in each segment. Inserts have constricted necks, enabling them to be grasped readily by the fingers of a user, even when the insert is filled with small objects. An individual tray is thereby readily removable, even if filled with small parts, independently of neighboring inserts. Inserts are optionally provided with tightly fitting caps. Both trays and inserts are provided in variable vertical dimensions. Two short inserts or trays occupy the same height within the bucket of a single tall insert or tray. Thus, the bucket is selectively reconfigurable to provide a desired combination of inserts and trays.

SUMMARY OF THE INVENTION

A primary object of the present invention is to provide a universal stackable locking container that will overcome the shortcomings of the prior art devices.

Another object is to provide a universal stackable locking container that contains a cover with a carry handle, which can be interlocked onto an uppermost tray of a plurality of interlocking independent trays for storing small articles within the trays in a convenient compact condition.

An additional object is to provide a universal stackable locking container, in which the height of the container can be varied depending upon the amount of trays interlocked one upon the other, so that different amounts and types of small articles can be stored within the trays.

A further object is to provide a universal stackable locking container that is simple and easy to use.

A still further object is to provide a universal stackable locking container that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is a cross sectional view taken along line 2—2 in FIG. 1 of the cover.

FIG. 3 is an enlarged exploded perspective view of the interlocking structures of the instant invention.

FIG. 4 is an enlarged cross sectional view taken along line 4—4 in FIG. 1, showing the interlocking structures before engagement.

FIG. 5 is an enlarged cross sectional view similar to FIG. 4, showing the interlocking structures starting to go into engagement.

FIG. 6 is an enlarged perspective view of an area indicated by arrow 6 in FIG. 1, showing the interlocking structures between two trays in engagement.

FIG. 7A is a top view taken in the direction of arrow 7A in FIG. 7A-1, showing eight upstanding radial partitions in a tray.

FIG. 7A-1 is a perspective view of FIG. 7A.

FIG. 7B is a top view taken in the direction of arrow 7B in FIG. 7B-1, showing three upstanding parallel partitions in a tray.

FIG. 7B-1 is a perspective view of FIG. 7B.

FIG. 7C is a top view taken in the direction of arrow 7C in FIG. 7C-1, showing four upstanding posts on a perforated bottom wall in a tray.

FIG. 7C-1 is a perspective view of FIG. 7C.

FIG. 7D is a top view taken in the direction of arrow 7D in FIG. 7D-1, showing four upstanding posts on a solid bottom wall in a tray.

FIG. 7D-1 is a perspective view of FIG. 7D.

FIG. 7E is a top view taken in the direction of arrow 7E in FIG. 7E-1, showing eight upstanding radial partitions with a cylindrical upstanding concentric partition in a tray.

FIG. 7E-1 is a perspective view of FIG. 7E.

FIG. 7F is a top view taken in the direction of arrow 7F in FIG. 7F-1, showing four upstanding radial partitions in a tray.

FIG. 7F-1 is a perspective view of FIG. 7F.

Similar reference characters denote corresponding features consistently throughout the attached drawings.

DETAILED DESCRIPTION OF THE PREFERRED EMBODIMENTS

Figure 1:
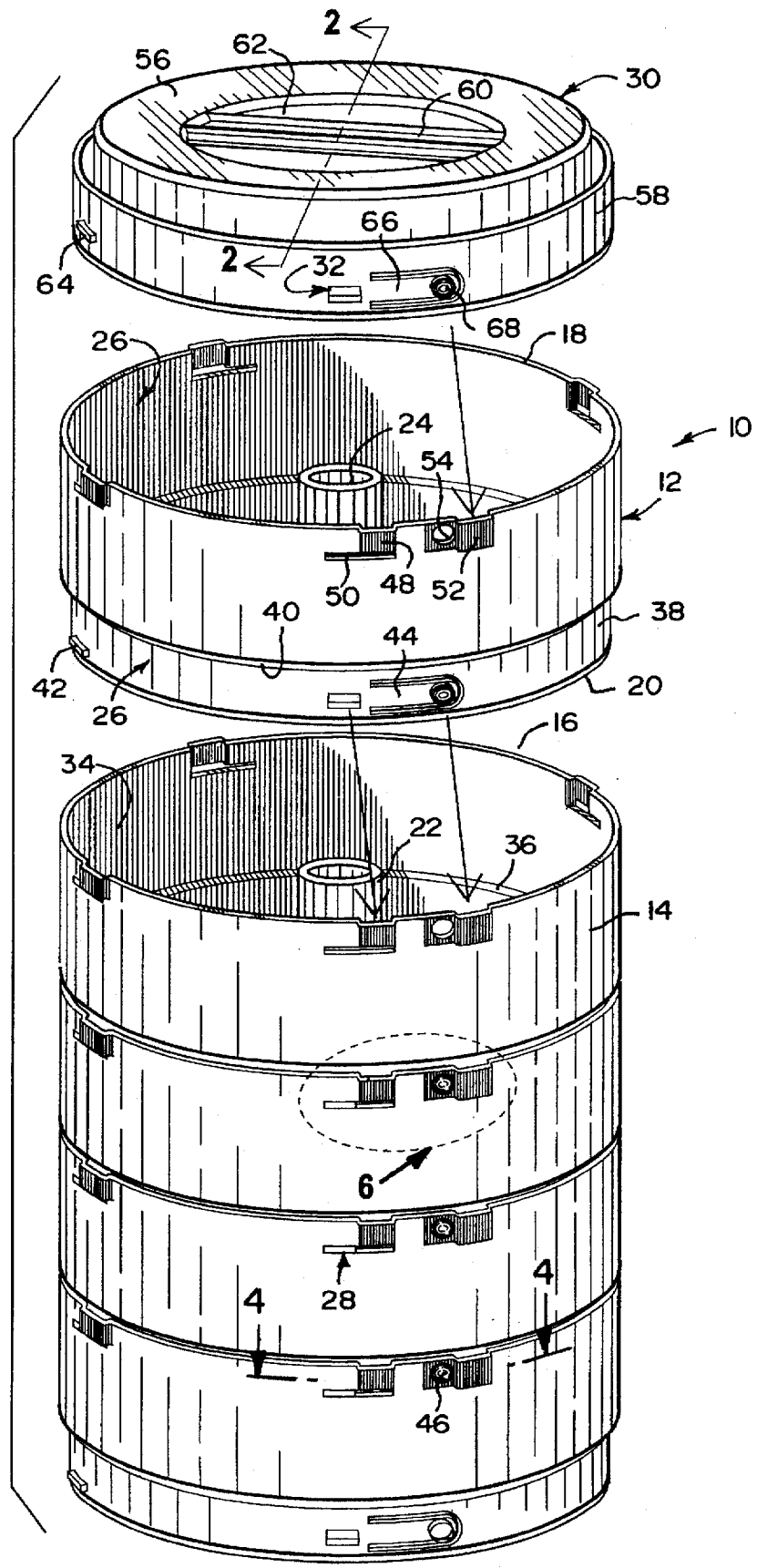
FIG. 1 is a perspective view of the instant invention partially disassembled.

Turning now descriptively to the drawings, in which similar reference characters denote similar elements throughout the several views, FIGS. 1 through 7F-1 illustrate a universal stackable locking container 10 comprising a plurality of independent trays 12, in which each tray 12 can store small articles therein. Each tray 12 includes a cylindrical side wall 14 having an open top 16 with an annular rim 18 thereabout, a disc-shaped bottom wall 20 and an upstanding central barrel 22 formed on the bottom wall 22. The barrel 22 has a finger hole 24 therethrough, so that a person can insert a finger into the finger hole 24 and grip the barrel 22 to lift and carry the tray 12. A structure 26 is in each tray 12, for stacking the trays 12 one upon the other. An assembly 28 is in each tray 12, for interlocking and unlocking the trays 12 when the trays are stacked one upon the other. A cover 30 fits upon the uppermost tray 12. A facility 32 is in the cover 30, for interlocking and unlocking the cover 30 to the uppermost tray 12.

Each tray stacking structure 26 includes an upper inner setback face 34 with an inner annular seat 36 on the side wall 14 directly below the rim 18. A lower outer setback face 38 with an outer annular seat 40 is on the side wall 14 directly above the bottom wall 20. When two of the trays 12 are stacked together, the lower outer setback face 38 of the upper tray 12 will fit into the open top 16 of the lower tray 12. The outer annular seat 40 of the upper tray 12 will nest on the rim 18 of the lower tray 12. The bottom wall 20 of the upper tray 12 will nest on the inner annular seat 36 of the lower tray 12.

Each tray interlocking and unlocking assembly 28 consists of the lower outer setback face 38 on the side wall 14 having a plurality of locking tabs 42 radially spaced thereabout, and one flexible button arm 44 with a locking button 46 thereon built into the side wall 14 adjacent one locking tab 42. The upper inner setback face 34 on the side wall 14 has a plurality of tab sockets 48 with associated horizontal slots 50 radially spaced thereabout at the annular rim 18 and a button socket 52 with an associated buttonhole 54 adjacent one tab socket 48.

When two of the trays 12 are stacked together and the lower outer setback face 38 of the upper tray 12 fits into the open top 16 of the lower tray 12, the locking tabs 42 will fit into the tab sockets 48, while the locking button 46 will fit into the button socket 52. When the upper tray 12 is slightly turned in a clockwise direction, the locking tabs 42 will engage with the slots 50 and the locking button 46 will engage with the buttonhole 54. When the upper tray 12 is slightly turned in a counter-clockwise direction, the locking tabs 42 will disengage from the slots 50 and the locking button 46 will disengage from the buttonhole 54.

The cover 30, as best seen in FIGS. 1 and 2, includes a dome-shaped lid 56. An upturned collar 58 extends about a bottom edge of the lid 56 to fit into the open top 16 of the uppermost tray 12. The cover 30 further includes a flush carry handle 60 affixed to the top of the lid 56 within a central recess 62 to be grasped by a hand of a person.

The cover interlocking and unlocking facility 32 consists of the collar 58 having a plurality of locking tabs 64 radially spaced thereabout and one flexible button arm 66 with a locking button 68 thereon adjacent one locking tab 64. When the collar 58 fits into the open top 16 of the uppermost tray 12, the locking tabs 64 will fit into the tab sockets 48, while the locking button 68 will fit into the button socket 52 in the uppermost tray 12. When the cover 30 is slightly turned in a clockwise direction, the locking tabs 64 will engage with the slots 50 and the locking button 68 will engage with the buttonhole 54. When the cover 30 is slightly turned in a counterclockwise direction, the locking tabs 64 will disengage from the slots 50 and the locking button 68 will disengage from the buttonhole 54.

Each tray 12, as shown in FIGS. 7A, 7A-1, 7F and 7F-1, can include a plurality of upstanding radial partitions 70, so as to divide the tray 12 into a plurality of compartments for storing the small articles therein. Each tray 12, as shown in FIGS. 7E and 7E-1, can include a cylindrical upstanding concentric partition 72 to intersect the radial partitions 70, so as to further divide the tray 12 in additional compartments for storing the small articles therein. Each tray 12, as shown in FIGS. 7B and 7B-1, can include a plurality of upstanding parallel partitions 74, so as to divide the tray 12 into a plurality of compartments for storing the small articles therein.

Each tray 12, as shown in FIGS. 7C, 7C-1, 7D and 7D-1, can include a plurality of upstanding posts 76 on the bottom wall 20 for holding the small articles thereon. The bottom wall 20 can be perforated with small apertures 78, as shown in FIG. 7C, to allow drainage of liquids therefrom. The trays 12 and the cover 30 are fabricated out of molded plastic material 80.

LIST OF REFERENCE NUMBERS 10 universal stackable locking container
12 tray of 10
14 cylindrical side wall of 12
16 open top of 14
18 annular rim on 14
20 disc-shaped bottom wall of 12
22 upstanding central barrel on 20
24 finger hole in 22
26 tray stacking structure in 12
28 tray interlocking and unlocking assembly in 12
30 cover of 10
32 cover interlocking and unlocking facility in 30
34 upper inner setback face on 14
36 inner annular seat on 14
38 lower outer setback face on 14
40 outer annular seat on 14
42 locking tab of 28 on 38
44 flexible button arm of 28 on 38
46 locking button of 28 on 44
48 tab socket of 28 on 34
50 horizontal slot of 28 on 34
52 button socket of 28 on 34
54 buttonhole of 28 on 34
56 dome-shaped lid of 30
58 upturned collar of 30 on 56
60 flush carry handle of 30 in 62
62 central recess in 56
64 locking tab of 32 on 58
66 flexible button arm of 32 on 58
68 locking button of 32 on 66
70 upstanding radial partition in 12
72 cylindrical upstanding concentric partition in 12
74 upstanding parallel partition in 12
76 upstanding post in 12
78 small aperture in 20
80 molded plastic material for 12 and 30

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A universal stackable locking container comprising:
   a) a plurality of independent trays, in which each said tray can store small articles therein, wherein each said tray includes a cylindrical side wall having an open top with an annular rim thereabout, a disc-shaped bottom wall and an upstanding central barrel formed on said bottom wall, in which said barrel has a finger hole therethrough, so that a person can insert a finger into said finger hole and grip said barrel to lift and carry said tray;
   b) means in each said tray, for stacking said trays one upon the other, wherein each said tray stacking means includes:
      i) an upper inner setback face with an inner annular seat on said side wall directly below said rim; and
      ii) a lower outer setback face with an outer annular seat on said side wall directly above said bottom wall, so that when two of said trays are stacked together, said lower outer setback face of the upper tray will fit into said open top of the lower tray, with said outer annular seat of said upper tray nesting on said rim of said lower tray and said bottom wall of said upper tray nesting on said inner annular seat of said lower tray;
   c) means in each said tray for interlocking and unlocking said trays when said trays are stacked one upon the other, wherein each said tray interlocking and unlocking means includes:
      i) said lower outer setback face on said side wall having a plurality of locking tabs radially spaced thereabout and one flexible button arm with a locking button thereon built into said side wall adjacent one said locking tab; and
      ii) said upper inner setback face on said side wall having a plurality of tab sockets with associated horizontal slots radially spaced thereabout at said annular rim and a button socket with an associated buttonhole adjacent one said tab socket, so that when two of said trays are stacked together and said lower outer setback face of said upper tray fits into said open top of said lower tray, said locking tabs will fit into said tab sockets, while said locking button will fit into said button socket, so that when said upper tray is slightly turned in a clockwise direction, said locking tabs will engage with said slots and said locking button will engage with said buttonhole and when said upper tray is slightly turned in a counterclockwise direction, said locking tabs will disengage from said slots and said locking button will disengage from said buttonhole;
   d) a cover to fit upon the uppermost tray; and
   e) means in said cover for interlocking and unlocking said cover to said uppermost tray.

2. A universal stackable locking container as recited in claim 1, wherein said cover includes:
   a) a dome-shaped lid; and
   b) an upturned collar extending about a bottom edge of said lid to fit into said open top of said uppermost tray.

3. A universal stackable locking container as recited in claim 2, wherein said cover further includes a flush carry handle affixed to the top of said lid within a central recess to be grasped by a hand of a person.

4. A universal stackable locking container as recited in claim 2, wherein said cover interlocking and unlocking means includes said collar having a plurality of locking tabs radially spaced thereabout and one flexible button arm with a locking button thereon adjacent one said locking tab, so that when said collar fits into said open top of said uppermost tray, said locking tabs will fit into said tab sockets, while said locking button will fit into said button socket in said uppermost tray, so that when said cover is slightly turned in a clockwise direction said locking tabs will engage with said slots and said locking button will engage with said buttonhole and when said cover is slightly turned in a counterclockwise direction, said locking tabs will disengage from said slots and said locking button will disengage from said buttonhole.

5. A universal stackable locking container as recited in claim 3, wherein said cover interlocking and unlocking means includes said collar having a plurality of locking tabs radially spaced thereabout and one flexible button arm with a locking button thereon adjacent one said locking tab, so that when said collar fits into said open top of said uppermost tray, said locking tabs will fit into said tab sockets, while said locking button will fit into said button socket in said uppermost tray, so that when said cover is slightly turned in a clockwise direction said locking tabs will engage with said slots and said locking button will engage with said buttonhole and when said cover is slightly turned in a counterclockwise direction, said locking tabs will disengage from said slots and said locking button will disengage from said buttonhole.

6. A universal stackable locking container as recited in claim 5, wherein each said tray includes a plurality of upstanding radial partitions, so as to divide said tray into a plurality of compartments for storing the small articles therein.

7. A universal stackable locking container as recited in claim 6, wherein each said tray includes a cylindrical upstanding concentric partition to intersect said radial partitions, so as to further divide said tray in additional compartments for storing the small articles therein.

8. A universal stackable locking container as recited in claim 5, wherein each said tray includes a plurality of upstanding parallel partitions, so as to divide said tray into a plurality of compartments for storing the small articles therein.

9. A universal stackable locking container as recited in claim 5, wherein each said tray includes a plurality of upstanding posts on said bottom wall for holding the small articles thereon.

10. A universal stackable locking container as recited in claim 9, wherein said bottom wall is perforated with small apertures to allow drainage of liquids therefrom.

11. A universal stackable locking container as recited in claim 5, wherein said trays and said cover are fabricated out of molded plastic material.

* * * * *